United States Patent
Kato et al.

(10) Patent No.: US 10,118,196 B2
(45) Date of Patent: Nov. 6, 2018

(54) LAMINATED COATING FILM AND COATED ARTICLE

(71) Applicant: MAZDA MOTOR CORPORATION, Hiroshima (JP)

(72) Inventors: Hidekazu Kato, Hiroshima (JP); Kana Haruki, Hiroshima (JP); Naoto Waku, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 279 days.

(21) Appl. No.: 15/032,531

(22) PCT Filed: Oct. 3, 2014

(86) PCT No.: PCT/JP2014/005061
§ 371 (c)(1),
(2) Date: Apr. 27, 2016

(87) PCT Pub. No.: WO2015/064015
PCT Pub. Date: May 7, 2015

(65) Prior Publication Data
US 2016/0256893 A1  Sep. 8, 2016

(30) Foreign Application Priority Data
Oct. 30, 2013  (JP) .................... 2013-225127

(51) Int. Cl.
*B05D 5/06*  (2006.01)
*B05D 7/00*  (2006.01)
(Continued)

(52) U.S. Cl.
CPC ............... *B05D 5/06* (2013.01); *B05D 5/065* (2013.01); *B05D 7/50* (2013.01); *B05D 7/54* (2013.01);
(Continued)

(58) Field of Classification Search
CPC . B05D 5/065; B05D 5/06; B05D 7/54; B05D 7/50; B05D 7/52–7/5885;
(Continued)

(56) References Cited

U.S. PATENT DOCUMENTS

2005/0228090 A1* 10/2005 Claar ....................... C09D 7/41
524/190
2009/0246415 A1  10/2009 Horie et al.
(Continued)

FOREIGN PATENT DOCUMENTS

JP  S62-124160 A  6/1987
JP  63240971 A  * 10/1988
(Continued)

OTHER PUBLICATIONS

Machine translation of JP63-240971. Retrieved Mar. 8, 2018.*
(Continued)

*Primary Examiner* — Prashant J Khatri
(74) *Attorney, Agent, or Firm* — Studebaker & Brackett PC

(57) ABSTRACT

A multilayer coating film includes a lower coating film 5 containing a colorant, and an upper coating film 6. If the upper coating film 6 has a refractive index n1 of greater than or equal to 1.2 and less than or equal to 1.5, the ratio n1/n2 of the refractive index n1 of this upper coating film 6 to the refractive index n2 of the lower coating film 5 is set to be greater than or equal to 0.67 and less than or equal to 1. If the upper coating film has a refractive index n1 of greater than or equal to 1.6 and less than or equal to 3.0, the refractive index ratio n1/n2 is set to be greater than 1 and less than or equal to 1.67.

2 Claims, 3 Drawing Sheets

(51) Int. Cl.
  *G02B 5/20* (2006.01)
  *G02B 5/28* (2006.01)
  *B32B 7/02* (2006.01)
  *B32B 27/20* (2006.01)
  *B32B 15/08* (2006.01)
  *B32B 15/18* (2006.01)
  *B32B 27/08* (2006.01)

(52) U.S. Cl.
  CPC ............... *B32B 7/02* (2013.01); *B32B 15/08* (2013.01); *B32B 15/18* (2013.01); *B32B 27/08* (2013.01); *B32B 27/20* (2013.01); *G02B 5/206* (2013.01); *G02B 5/286* (2013.01); *B32B 2255/06* (2013.01); *B32B 2255/26* (2013.01); *B32B 2307/402* (2013.01); *B32B 2307/418* (2013.01); *B32B 2605/08* (2013.01); *Y10T 428/24942* (2015.01); *Y10T 428/25* (2015.01); *Y10T 428/259* (2015.01)

(58) Field of Classification Search
  CPC .... G02B 5/20–5/289; G02B 1/00–1/18; B32B 7/02; B32B 27/20; B32B 15/18; B32B 27/08; B32B 15/08
  See application file for complete search history.

(56) References Cited

U.S. PATENT DOCUMENTS

| | | |
|---|---|---|
| 2010/0092765 A1 | 4/2010 | Hager et al. |
| 2013/0071649 A1 | 3/2013 | Hager et al. |

FOREIGN PATENT DOCUMENTS

| | | | |
|---|---|---|---|
| JP | 2-241577 | A | 9/1990 |
| JP | 6-254480 | A | 9/1994 |
| JP | 11-077874 | A | 3/1999 |
| JP | 2001-149855 | A | 6/2001 |
| JP | 2004-313922 | A | 11/2004 |
| JP | 2005-013888 | A | 1/2005 |
| JP | 2005-099675 | A | 4/2005 |
| JP | 2005-132108 | A | 5/2005 |
| JP | 2006-007006 | A | 1/2006 |
| JP | 2007-030384 | A | 2/2007 |
| JP | 2007-136362 | A | 6/2007 |
| JP | 2007-182511 | A | 7/2007 |
| JP | 2007-260541 | A | 10/2007 |
| JP | 2008-012837 | A | 1/2008 |
| JP | 2008-026658 | A | 2/2008 |
| JP | 2008-044835 | A | 2/2008 |
| JP | 2009-037064 | A | 2/2009 |
| JP | 2009-244382 | A | 10/2009 |
| JP | 2010279899 | A * | 12/2010 |
| JP | 2012-505295 | A | 3/2012 |
| JP | 2013-142793 | A | 7/2013 |

OTHER PUBLICATIONS

Machine translation of JP2010-279899. Retrieved Mar. 8, 2018.*
International Search Report and Written Opinion issued in Application No. PCT/JP2014/005061, dated Jan. 6, 2015.

* cited by examiner

LAMINATED COATING FILM AND COATED ARTICLE

TECHNICAL FIELD

The present invention relates to a multilayer coating film and a coated article.

BACKGROUND ART

In coating the body of an automobile or any other substrate, a coating film structure is generally used which includes an undercoating film made of an anticorrosive electrodeposition paint, an intermediate coating film having undercoat concealability and formed on the undercoating film, and a top coating film (a base coating film and a clear coating film) superimposed on the intermediate coating film. In view of savings in resources and other factors, an attempt has also been made to omit such an intermediate coating film and superimpose a top coating film directly on an undercoating film. For example, an attempt has been made to form a base coating film having undercoat concealability on a cationic electrodeposition coating film and form a clear coating film on the base coating film.

An attempt to provide new design properties to an automotive coating film by adjusting the refractive indices of base and clear coating films has been conventionally known. For example, Patent Document 1 discloses that the refractive index of a clear coating film is set to be 1.522, and the difference in refractive index between a base coating film and the clear coating film is set to be greater than or equal to 0.015, thereby allowing the brilliance of a coating to vary among the angles at which a viewer sees the coating. Patent Document 1 further discloses that an acrylic resin having a t-butyl methacrylate content of greater than or equal to 50 mass % has a low refractive index, and an acrylic resin having a styrene content of greater than or equal to 40 mass % has a high refractive index.

Patent Document 2 discloses that $ZnO_2$ nanoparticles increase the refractive index of a resin if they are dispersed into the resin, and that a resin thus obtained is used as a paint composition. Patent Document 3 discloses that a clear-coated body panel of an automobile is coated with a silane coating composition containing silica nanoparticles to provide antireflection surface properties.

CITATION LIST

Patent Document

PATENT DOCUMENT 1: Japanese Unexamined Patent Publication No. 2006-007006
PATENT DOCUMENT 2: Japanese Unexamined Patent Publication No. 2008-044835
PATENT DOCUMENT 3: Japanese Unexamined Patent Publication (Japanese Translation of PCT Application) No. 2012-505295

SUMMARY OF THE INVENTION

Technical Problem

Coating is performed to provide design properties to a target article, but individual preferences have recently varied. Specifically, it may be preferred that a bright color should appear, that a darker muted color should appear, or that brightness should vary among the angles at which a viewer sees the target article.

That is to say, a first aspect of the present invention relates to a multilayer coating film including a lower coating film containing a colorant, and an upper coating film stacked on the lower coating film, and is to provide a bright coating color with an appearance of depth by adjusting the refractive indices of both of the coating films.

A second aspect of the present invention relates to a multilayer coating film including a lower coating film containing a colorant, and an upper coating film stacked on the lower coating film, and is to provide a muted coating color with high flip-flop (FF) by adjusting the refractive indices of both of the coating films.

Solution to the Problem

According to the present invention, to achieve the first aspect, the refractive index of an upper coating film is reduced, and the refractive index of a lower coating film is set based on the relation between this refractive index and the refractive index of the upper coating film.

Specifically, a multilayer coating film according to this aspect includes: a lower coating film containing a colorant; and an upper coating film stacked on the lower coating film. A constituent of the upper coating film excluding a colorant has a refractive index $n1$ of greater than or equal to 1.2 and less than or equal to 1.5, and a ratio $n1/n2$ of the refractive index $n1$ of the upper coating film to a refractive index $n2$ of a constituent of at least a shallow portion of the lower coating film excluding the colorant is greater than or equal to 0.67 and less than or equal to 1.

The "colorant" as used herein means a component that imparts a color to a coating film, such as a pigment, a dye, or a bright material.

The multilayer coating film includes the upper coating film having a lower refractive index $n1$ than a conventional clear coating film. Thus, the reflection of incident light off the surface of the upper coating film (hereinafter referred to as the "surface reflection") is reduced. In other words, the transmittance of light increases. Furthermore, the situation where the refractive index ratio $n1/n2$ is greater than or equal to 0.67 and less than or equal to 1 means that the difference in refractive index between the upper and lower coating films is small. This may reduce the reflection of light off the interface between the upper and lower coating films (hereinafter referred to as the "interface reflection"), and may prevent light from being strongly irregularly reflected even if the interface is uneven. In addition, the situation where the refractive index ratio $n1/n2$ is less than or equal to 1 means that when light is incident on the lower coating film through the upper coating film, light is not totally reflected off the interface between these coating films.

The transmittance of light, i.e., the ratio of light components entering the lower coating film to incident light components, is increased by reducing the surface reflection and the interface reflection as described above. As a result, the probability of contact between incident light and the colorant increases. This prevents a whitish coating color from being provided, and the colorant provides a brighter color. In addition, since light is not totally reflected off the interface between the upper and lower coating films, lightness does not vary significantly among the angles at which a viewer sees the coating films. This helps provide a brighter color.

The refractive index of the upper coating film is low, and is closer to that of air. Thus, the color of the colorant of the lower coating film is recognized at a location further away from the surface of the upper coating film than ever before, thereby providing an appearance of depth.

In a preferred embodiment of the present invention, the constituent of the upper coating film excluding the colorant contains a resin as a main ingredient. The resin contains nanoparticles having a lower refractive index than the resin.

Thus, while a general-purpose resin, such as an acrylic resin, is employed, the refractive index of the constituent is more easily set to be an intended low value.

In a preferred embodiment of the present invention, the refractive index $n2$ of the lower coating film is less than or equal to 1.5 (preferably less than or equal to 1.4). In other words, the upper and lower coating films each have a low refractive index. Thus, while the surface reflection is reduced by reducing the refractive index of the upper coating film, the refractive index ratio $n1/n2$ is set to approach 1 (for example, to be greater than 0.9 and less than or equal to 1), thereby more easily reducing the interface reflection.

Next, the invention according to the second aspect will be described. According to the present invention, to achieve the second aspect, the refractive index of an upper coating film is increased, and the refractive index of a lower coating film is set based on the relation between this refractive index and the refractive index of the upper coating film.

Specifically, a multilayer coating film according to this aspect includes: a lower coating film containing a colorant; and an upper coating film stacked on the lower coating film. A constituent of the upper coating film excluding a colorant has a refractive index $n1$ of greater than or equal to 1.6 and less than or equal to 3.0, and a ratio $n1/n2$ of the refractive index $n1$ of the upper coating film to a refractive index $n2$ of a constituent of at least a shallow portion of the lower coating film excluding the colorant is greater than 1 and less than or equal to 1.67.

Since this multilayer coating film includes the upper coating film having a high refractive index $n1$, incident light is more strongly reflected off the surface of the upper coating film. As a result, the proportion of light incident on the lower coating film through the upper coating film decreases, and a darker muted color is thus provided. In addition, the situation where the refractive index ratio $n1/n2$ is greater than 1 means that when light is incident on the lower coating film through the upper coating film, light is totally reflected off the interface between these coating films, and as a result, the color does not reach a viewer's eyes. Thus, a darker color is provided.

As described above, light is strongly reflected off the surface of the multilayer coating film, and total reflection occurs. Thus, appearances vary significantly among the angles at which a viewer sees the coating film, so that the coating film may shine to make it the color invisible, or the color may be visible. Thus, it can be said that high FF (flip-flop) is obtained.

The situation where the ratio $n1/n2$ of the refractive index of the upper coating film to that of the lower coating film is greater than 1 and less than or equal to 1.67 means that the difference in refractive index between these coating films is small. This may reduce the reflection of incident light off the interface between the upper and lower coating films, and may prevent light from being strongly irregularly reflected off the interface even if the interface is uneven. Thus, providing a whitish coating color is prevented.

In a preferred embodiment of the present invention, the constituent of the upper coating film excluding the colorant contains a resin as a main ingredient. The resin contains nanoparticles having a higher refractive index than the resin.

Thus, while a general-purpose resin, such as an acrylic resin, is employed, the refractive index of the coating film constituent is more easily set to be an intended high value.

In a preferred embodiment of the present invention, the refractive index $n2$ of the lower coating film is less than or equal to 1.5 (preferably less than or equal to 1.4). In other words, while the upper coating film is set to have a high refractive index, the lower coating film is set to have a low refractive index. This may reduce the critical angle of total reflection by increasing the refractive index ratio $n1/n2$ without excessively increasing the refractive index $n1$ of the upper coating film, and may make it easier to provide an appearance of depth. In addition, since the refractive index $n1$ of the upper coating film does not have to be excessively increased, if this refractive index is adjusted by adding nanoparticles, the amount of the nanoparticles added is reduced. This helps ensure the strength of the coating film.

Advantages of the Invention

According to the multilayer coating film of the first aspect of the present invention, a constituent of an upper coating film excluding a colorant has a refractive index $n1$ of greater than or equal to 1.2 and less than or equal to 1.5, and the ratio $n1/n2$ of the refractive index $n1$ of the upper coating film to the refractive index $n2$ of a constituent of at least a shallow portion of a lower coating film excluding a colorant is greater than or equal to 0.67 and less than or equal to 1. A bright coating color having lightness that does not vary significantly among the angles at which a viewer sees the coating film may be provided.

According to the multilayer coating film of the second aspect of the present invention, a constituent of an upper coating film excluding a colorant has a refractive index $n1$ of greater than or equal to 1.6 and less than or equal to 3.0, and the ratio $n1/n2$ of the refractive index $n1$ of the upper coating film to the refractive index $n2$ of a constituent of at least a shallow portion of a lower coating film excluding a colorant is greater than 1 and less than or equal to 1.67. A muted coating color with an appearance of depth may be provided.

DESCRIPTION OF EMBODIMENTS

Embodiments of the present invention will now be described with reference to the drawings. The following preferred embodiments are set forth merely for the purposes of examples in nature, and are not intended to limit the scope, applications, and use of the invention.

Figure 1:
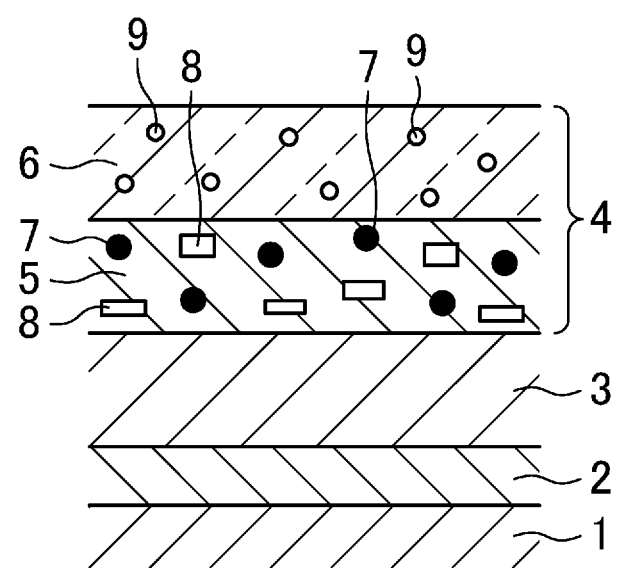
FIG. 1 is a cross-sectional view illustrating an exemplary multilayer coating film according to the present invention.

In the multilayer coating film illustrated in FIG. 1, the reference numeral 1 denotes a target article made of steel (e.g., a body outer plate of an automobile). An undercoating film 2 made of an epoxide-based cationic electrodeposition paint is formed on the surface of this target article 1. An intermediate coating film 3 having undercoat concealability to increase light resistance, chipping resistance, and coloring performance is superimposed on this undercoating film 2. Then, a top coating film 4 is superimposed on the intermediate coating film 3.

The top coating film 4 includes a base coating film (lower coating film) 5, and a clear coating film (upper coating film) 6 superimposed on the base coating film 5. The base coating film 5 includes a pigment 7, a bright material 8, and other suitable materials that function as a colorant and are dispersed into a resin, and provides coloring performance and design properties to the multilayer coating film. The clear coating film 6 provides weather resistance and wear resistance to the multilayer coating film. In the example shown in FIG. 1, the clear coating film 6 contains nanoparticles 9 for adjusting its refractive index.

The present invention is characterized in that the refractive index n1 of the clear coating film 6 and the refractive index n2 of the base coating film 5 are optimized. The refractive indices n1 and n2 are each the refractive index of a constituent of an associated one of the coating films except the colorant. The feature of the present invention will now be specifically described.

<Relation Between Refractive Index n1 of Clear Coating Film and Surface Reflectance/Interface Reflectance>

The surface reflectance R of a light beam incident perpendicularly on a material having a refractive index N1 through a material having a refractive index N0 has been known to be given by the following formula.

$$R=((N0-N1)/(N0+N1))^2$$

Figure 2:
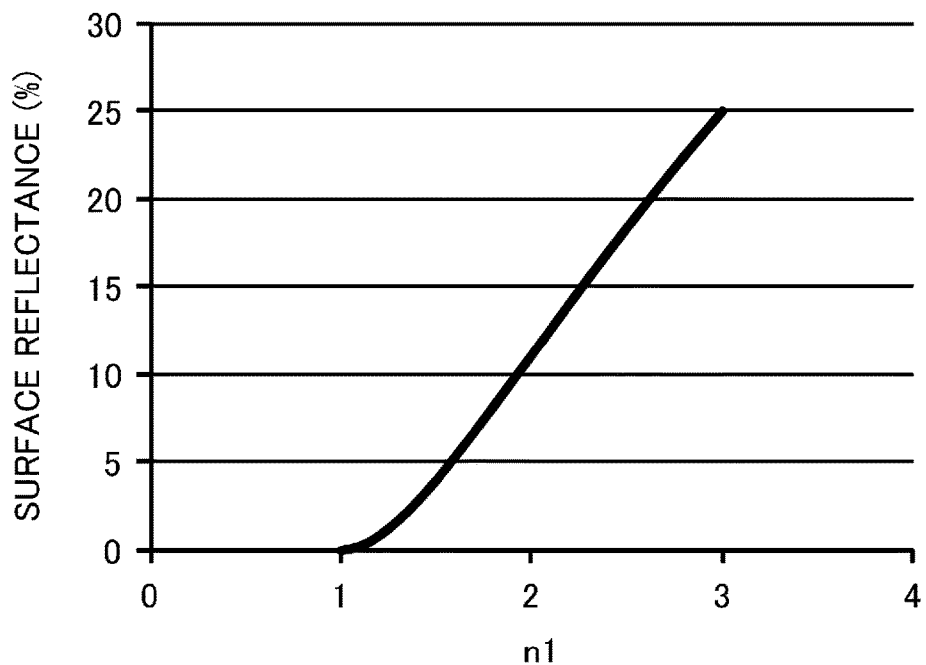
FIG. 2 is a graph showing the relation between the refractive index $n1$ of a clear coating film and the reflectance at the surface of the clear coating film.

The surface reflectance (perpendicular reflectance) of light incident perpendicularly on the clear coating film 6 having the refractive index n1 through air is calculated by the above formula, and is shown in Table 1, where the refractive index of air is 1. As shown in FIG. 2, as the refractive index n1 increases, the surface reflectance increases.

TABLE 1

| Refractive Index n1 | Perpendicular Reflectance |
|---|---|
| 1 | 0 |
| 1.1 | 0.23 |
| 1.2 | 0.83 |
| 1.3 | 1.7 |
| 1.4 | 2.78 |
| 1.5 | 4 |
| 1.6 | 5.33 |
| 1.7 | 6.72 |
| 1.8 | 8.16 |
| 1.9 | 9.63 |
| 2 | 11.11 |
| 2.1 | 12.59 |
| 2.2 | 14.06 |
| 2.3 | 15.52 |
| 2.4 | 16.96 |
| 2.5 | 18.37 |
| 2.6 | 19.75 |
| 2.7 | 21.11 |
| 2.8 | 22.44 |

TABLE 1-continued

| Refractive Index n1 | Perpendicular Reflectance |
|---|---|
| 2.9 | 23.73 |
| 3 | 25 |

Figure 3:
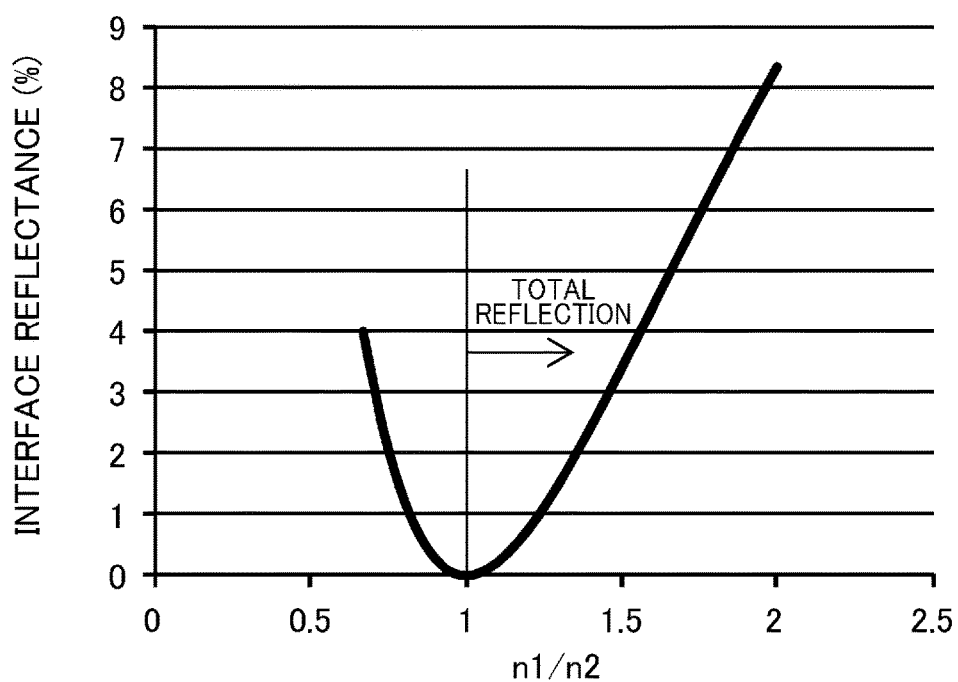
FIG. 3 is a graph showing the relation between the ratio of the refractive index $n1$ of the clear coating film to the refractive index $n2$ of a base coating film and the reflectance at the interface between the clear and base coating films.

The reflectance (perpendicular reflectance) of light incident perpendicularly on the clear coating film 6 having the refractive index n1 through air at the interface between the base coating film 5 and the clear coating film 6 is shown in Table 2, where the refractive index of air is 1, and the refractive index n2 of the base coating film 5 is 1.5. As shown in FIG. 3, if the refractive index ratio n1/n2 is 1, the interface reflectance is zero. As the ratio n1/n2 decreases from one, the interface reflectance increases. As the ratio n1/n2 increases from one, the interface reflectance increases.

TABLE 2

| Refractive Index n1 | Ratio n1/n2 | Perpendicular Reflectance | Critical Angle (°) |
|---|---|---|---|
| 1 | 0.67 | 4 | None |
| 1.1 | 0.73 | 2.36 | None |
| 1.2 | 0.8 | 1.22 | None |
| 1.3 | 0.87 | 0.5 | None |
| 1.4 | 0.93 | 0.12 | None |
| 1.5 | 1 | 0 | 90 |
| 1.6 | 1.07 | 0.1 | 69.6 |
| 1.7 | 1.13 | 0.36 | 61.9 |
| 1.8 | 1.2 | 0.76 | 56.4 |
| 1.9 | 1.27 | 1.25 | 52.1 |
| 2 | 1.33 | 1.81 | 48.6 |
| 2.1 | 1.4 | 2.43 | 45.6 |
| 2.2 | 1.47 | 3.08 | 43 |
| 2.3 | 1.53 | 3.74 | 40.7 |
| 2.4 | 1.6 | 4.42 | 38.7 |
| 2.5 | 1.67 | 5.1 | 36.9 |
| 2.6 | 1.73 | 5.78 | 35.2 |
| 2.7 | 1.8 | 6.44 | 33.7 |
| 2.8 | 1.87 | 7.09 | 32.4 |
| 2.9 | 1.93 | 7.72 | 31.1 |
| 3 | 2 | 8.33 | 30 |

The interface reflectance is calculated by the following formula.

Interface Reflectance=(Perpendicular Transmittance of Light Transmitted Through Air To Clear Coating Film 6)×(Perpendicular Reflectance at Interface between Base Coating Film 5 and Clear Coating Film 6)

Figure 4:
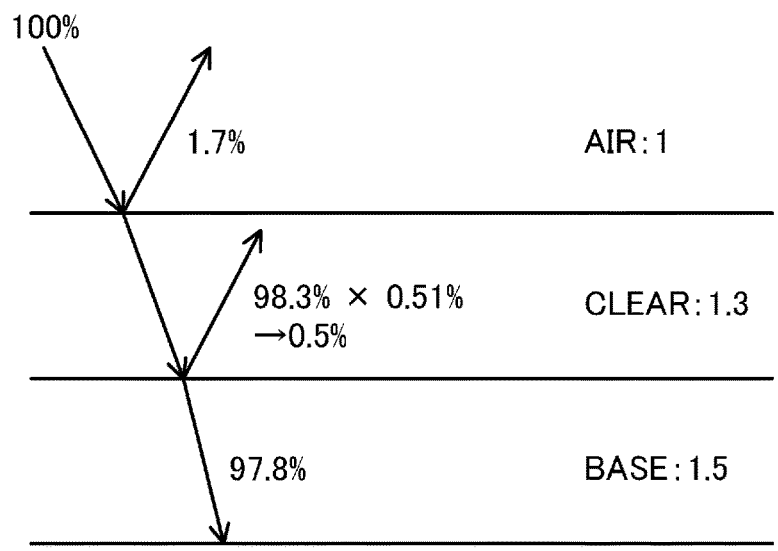
FIG. 4 exemplifies the perpendicular reflectance and transmittance of light on the multilayer coating film in the situation where the clear coating film is set to have a low refractive index.

FIG. 4 exemplifies the perpendicular reflectance and transmittance of light on the multilayer coating film, where the refractive index n1 of the clear coating film 6 is equal to 1.3. Table 1 shows that the perpendicular reflectance of light at the surface of the clear coating film 6 having a refractive index n1 of 1.3 is 1.7%. Since the refractive index n2 of the base coating film 5 is equal to 1.5, the perpendicular reflectance at the interface between the base coating film 5 and the clear coating film 6, which is calculated by the relational expression between the refractive index and the reflectance, is 0.51%.

Thus, since 1.7% of all light components from a light source are reflected off the surface of the clear coating film 6, the transmittance, i.e., the ratio of some of the light components entering the clear coating film 6 to the incident light components, is 98.3%. Since 0.51% of transmitted light components corresponding to 98% of the light components are reflected off the interface between the base coating film 5 and the clear coating film 6, the interface reflectance is obtained as follows:

$98.3\% \times 0.51 \times 0.01 \approx 0.50\%$

Figure 5:
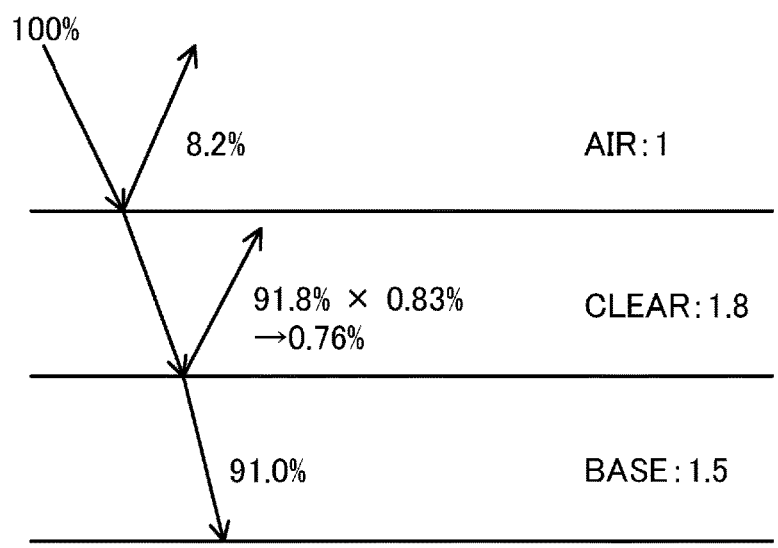
FIG. 5 exemplifies the perpendicular reflectance and transmittance of light on the multilayer coating film in the situation where the clear coating film is set to have a high refractive index.

FIG. 5 exemplifies the perpendicular reflectance and transmittance of light on the multilayer coating film, where the refractive index n1 of the clear coating film 6 is equal to 1.8. Table 1 shows that the perpendicular reflectance of light at the surface of the clear coating film 6 having a refractive index n1 of 1.8 is 8.2%. Since the refractive index n2 of the base coating film 5 is equal to 1.5, the perpendicular reflectance at the interface between the base coating film 5 and the clear coating film 6 is 0.83%.

Thus, since 8.2% of all light components from a light source are reflected off the surface of the clear coating film 6, the transmittance, i.e., the ratio of some of the light components entering the clear coating film 6 to the incident light components, is 91.8%. Since 0.83% of transmitted light components corresponding to 91.8% of the light components are reflected off the interface between the base coating film 5 and the clear coating film 6, the interface reflectance is obtained as follows:

$91.8\% \times 0.83 \times 0.01 \approx 0.76\%$

First Embodiment

In this embodiment, the refractive index n1 of a clear coating film 6 is set to be greater than or equal to 1.2 and less than or equal to 1.5, and the ratio n1/n2 of this refractive index n1 to the refractive index n2 of a base coating film 5 is set to be greater than or equal to 0.67 and less than or equal to 1.

The situation where the refractive index n1 of the clear coating film 6 is greater than or equal to 1.2 and less than or equal to 1.5 means that, as is clear from Table 1, the surface reflectance (perpendicular reflectance) of light on the clear coating film 6 is less than or equal to 4%, and the transmittance of light, i.e., the ratio of light components entering the clear coating film 6 to incident light components, is relatively high. The situation where the refractive index ratio n1/n2 is greater than or equal to 0.67 and less than or equal to 1 means that the perpendicular reflectance at the interface between the base coating film 5 and the clear coating film 6 is less than or equal to 4%, and the transmittance of light, i.e., the ratio of light components entering the base coating film 5 to incident light components, is relatively high. Furthermore, the situation where the refractive index ratio n1/n2 is less than or equal to 1 means that the refractive index n1 of the clear coating film 6 is lower than the refractive index n2 of the base coating film 5, i.e., that light is not totally reflected off the interface between the base coating film 5 and the clear coating film 6.

Thus, according to this embodiment, the transmittance of light, i.e., the ratio of light components entering the base coating film 5 to incident light components, increases. As a result, the probability of contact between incident light and a colorant (a pigment 7 and a bright material 8) increases, and a brighter color is provided. Furthermore, since the reflectance at the interface between the base coating film 5 and the clear coating film 6 is low, irregular reflections of light at this interface are reduced. In addition, since light is not totally reflected off the interface between the upper and lower coating films, lightness does not vary significantly among the angles at which a viewer sees the coating films.

First Example

Table 3 shows a configuration for a top coating film of a first example.

TABLE 3

| First Example | | Solid Content Mass % |
|---|---|---|
| Base Coating Film | Resin: Acrylic Resin | 95 |
| | Pigment: Carbon Black | 5 |
| Clear Coating Film | Resin: Clear Acrylic Resin | 60 |
| | Nanoparticles: SiO$_2$ | 40 |

In Table 3, an acrylic resin (having an acid value of 20 mgKOH/g, a hydroxyl value of 75 mgKOH/g, a number average molecular weight of 5000, and a solid content of 60 mass %) manufactured by NIPPONPAINT Co., Ltd., was used as an acrylic resin forming a base coating film 5. Mitsubishi carbon black #2650 manufactured by Mitsubishi Chemical Industries, Ltd., was used as a pigment. The refractive index n2 of the base coating film 5 was 1.5.

An acrylic resin manufactured by NIPPONPAINT Co., Ltd. was used as a clear acrylic resin forming a clear coating film 6. To adjust the refractive index n1 of the clear coating film 6 to a lower level, SiO$_2$ nanoparticles were added to the clear acrylic resin. Nano Tek Slurry (having a SiO$_2$ solid content of 20 mass %) manufactured by C. I. Kasei Co., Ltd., was used as SiO$_2$ nanoparticles. The refractive index n1 of the clear coating film 6 was 1.4.

Second Example

Table 4 shows a configuration for a top coating film of a second example.

TABLE 4

| Second Example | | Solid Content Mass % |
|---|---|---|
| Base Coating Film | Resin: Acrylic Resin | 80 |
| | Pigment: Carbon Black | 10 |
| | Nanoparticles: SiO$_2$ | 10 |
| Clear Coating Film | Resin: Clear Acrylic Resin | 60 |
| | Nanoparticles: SiO$_2$ | 40 |

Unlike the first example, SiO$_2$ nanoparticles (Nano Tek Slurry (having a SiO$_2$ solid content of 20 mass %) manufactured by C. I. Kasei Co., Ltd.) were added to a base coating film 5 so that the refractive index n2 of the base coating film 5 was equal to 1.4.

Comparative Example

Table 5 shows a configuration for a top coating film of a comparative example.

TABLE 5

| Comparative Example | | Solid Content Mass % |
|---|---|---|
| Base Coating Film | Resin: Acrylic Resin | 95 |
| | Pigment: Carbon Black | 5 |
| Clear Coating Film | Resin: Clear Acrylic Resin | 100 |

Unlike the first example, a clear coating film did not contain SiO$_2$ nanoparticles, and was made of only a clear acrylic resin manufactured by NIPPONPAINT Co., Ltd., and its refractive index was equal to 1.5.

Second Embodiment

In this embodiment, the refractive index n1 of a clear coating film 6 is set to be greater than or equal to 1.6 and less than or equal to 3.0, and the ratio n1/n2 of this refractive index n1 to the refractive index n2 of a base coating film 5 is set to be greater than 1 and less than or equal to 1.67.

The situation where the refractive index n1 of the clear coating film 6 is greater than or equal to 1.6 and less than or equal to 3.0 means that, as is clear from Table 1, the surface reflectance (perpendicular reflectance) at the clear coating film 6 is greater than or equal to 5%, and the proportion of light entering the base coating film 5 through the clear coating film 6 decreases. The situation where the refractive index ratio n1/n2 is greater than 1 and less than or equal to 1.67 means that the difference in refractive index between these coating films is small. The situation where the refractive index ratio n1/n2 is greater than 1 means that when light is incident on the base coating film 5 through the clear coating film 6, light is totally reflected off the interface between these coating films.

Thus, according to this embodiment, lightness varies among the angles at which a viewer sees the coating films (i.e., high FF is provided), thereby allowing a coating color to have an appearance of depth. In addition, since light is strongly reflected off the surface, a darker muted coating color is obtained.

Third Example

Table 6 shows a configuration for a top coating film of a third example.

TABLE 6

| Third Example | | Solid Content Mass % |
|---|---|---|
| Base Coating Film | Resin: Acrylic Resin | 95 |
| | Pigment: Carbon Black | 5 |
| Clear Coating Film | Resin: Clear Acrylic Resin | 60 |
| | Nanoparticles: $ZrO_2$ | 40 |

A base coating film 5 was identical to that of the first example, and its refractive index n2 was 1.5. Unlike the first example, a clear coating film 6 contained not $SiO_2$ nanoparticles but $ZrO_2$ nanoparticles so as to adjust its refractive index n1 to a higher level. A $ZrO_2$ nanoparticle dispersion (having a $ZrO_2$ solid content of 20 mass %) manufactured by Sumitomo Osaka Cement Co., Ltd., was used as $ZrO_2$ nanoparticles. The refractive index n1 of the clear coating film 6 was 1.8.

Fourth Example

Table 7 shows a configuration for a top coating film of a fourth example.

TABLE 7

| Fourth Example | | Solid Content Mass % |
|---|---|---|
| Base Coating Film | Resin: Acrylic Resin | 80 |
| | Pigment: Carbon Black | 10 |
| | Nanoparticles: $SiO_2$ | 10 |
| Clear Coating Film | Resin: Clear Acrylic Resin | 80 |
| | Nanoparticles: $ZrO_2$ | 20 |

Unlike the third example, $SiO_2$ nanoparticles (Nano Tek Slurry (having a $SiO_2$ solid content of 20 mass %) manufactured by C. I. Kasei Co., Ltd.) were added to a base coating film 5 so that the refractive index n2 of the base coating film 5 was equal to 1.4.

<Others>

The base coating film 5 of each of the embodiments is a single layer. However, the base coating film 5 may be structured to include two upper and lower subfilms, and the refractive index n2 of the upper base coating subfilm may be set just like an associated one of the first and second embodiments.

The present invention may be applied also to a situation where a transparent color base coating film is used as the base coating film 5 of the top coating film 4, and the intermediate coating film 3 is made of color paint for intermediate coating. In this case, the refractive index n1 of the transparent color base coating film 5 serving as an upper coating film and the refractive index n2 of the color intermediate coating film 3 serving as a lower coating film are set just like each of the first and second embodiments.

In each of the embodiments, the intermediate coating film is provided between the undercoating film and the top coating film. However, the present invention may be applied also to a multilayer coating film that does not include an intermediate coating film but includes an undercoating film and a base coating film superimposed directly on the undercoating film.

Speaking of a colorant, a dye may be used instead of or in combination with the pigment.

DESCRIPTION OF REFERENCE CHARACTERS

1 Target Article
2 Undercoating Film
3 Intermediate Coating Film
4 Top Coating Film
5 Base Coating Film (Lower Coating Film)
6 Clear Coating Film (Upper Coating Film)
7 Pigment (Colorant)
8 Bright Material (Colorant)
9 Nanoparticle

The invention claimed is:

1. A multilayer coating film comprising:
a lower coating film configured to be provided on a target article, the lower coating film containing a colorant and a second constituent; and
an upper coating film stacked on the lower coating film, the upper coating film containing a first constituent, wherein
the upper coating film is stacked directly on the lower coating film,
the first constituent contains a resin as a main ingredient, the resin containing nanoparticles that have a higher refractive index than the resin,
the first constituent has a refractive index n1 of greater than or equal to 1.6,
the second constituent has a refractive index n2 of less than or equal to 1.4, and
a ratio n1/n2 of the refractive index n1 of the first constituent to the refractive index n2 of the second constituent is greater than 1 and less than or equal to 1.67.

2. A coated article, wherein
the multilayer coating film of claim 1 is provided on the target article.

* * * * *